May 8, 1956
J. D. BALDWIN, JR
2,744,535
RELIEF VALVE CAP
Filed March 20, 1953
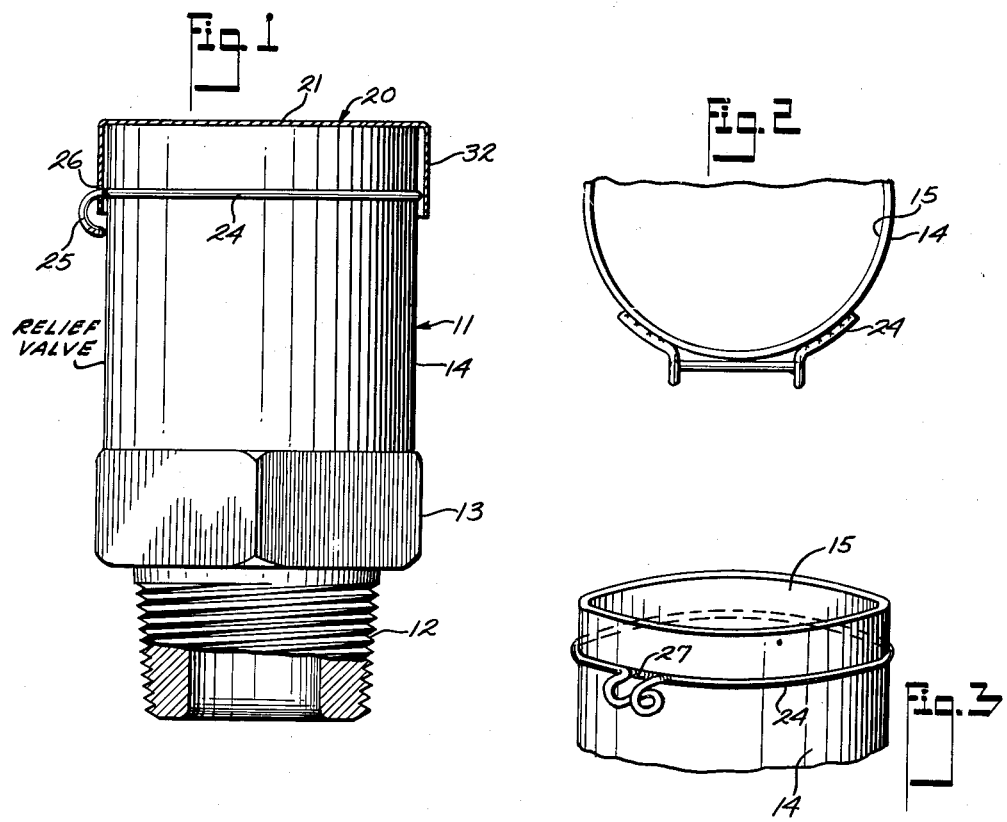
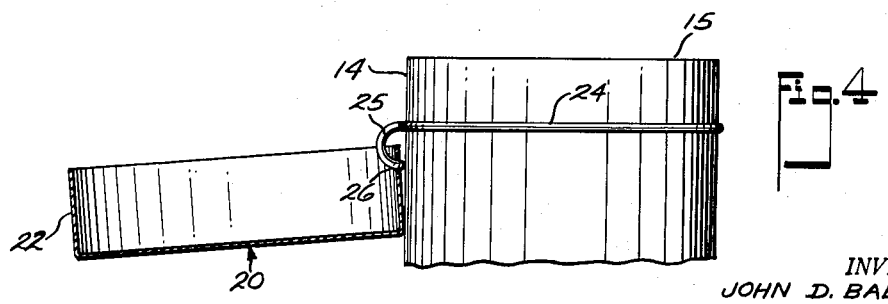
INVENTOR.
JOHN D. BALDWIN, JR.
BY
RICHEY, WATTS, EDGERTON & McNENNY
ATTORNEYS

United States Patent Office 2,744,535
Patented May 8, 1956

2,744,535

RELIEF VALVE CAP

John D. Baldwin, Jr., Highland Heights, Ohio, assignor to The Weatherhead Company, Cleveland, Ohio, a corporation of Ohio Application March 20, 1953, Serial No. 343,655

2 Claims. (Cl. 137—377)

This invention relates to relief valves and is particularly directed to the provision of a relief valve in which the mechanism is protected from the elements without sacrificing efficiency, compactness or economy in the valve.

In many applications of relief valves, such as in installations containing liquefied petroleum gases, it is imperative that the valve be immune from any effects of the elements. In such installations, if moisture is permitted to condense or collect in the valve, mechanism freezing can occur which would make the valve inoperative and thereby lose all of its effectiveness as a protection for the system. The most suitable location for relief valves on liquefied gas tanks is at the top of the tank and the normal direction of the outlet relief valve is vertical. With this position of the outlet there is an ever present danger that snow and rain will collect in the valve body which may corrode the mechanism or freeze and cause malfunction of the valve.

It is obvious that it is of the highest importance that a relief valve be completely reliable and free from failure since valve failure can destroy the entire system on which the valve is installed. In some cases the valve has been protected by providing a reverse bend in the outlet so that it discharges downward. Such construction is disadvantageous, however, since it is cumbersome, expensive and causes back pressure in the outlet from the relief valve with the result that a larger relief valve is required for a given capacity. A permanent hood over the valve outlet is less effective and suffers from the same disadvantages. Other attempts to solve this problem have employed frangible discs covering the outlet of the relief valve. This structure has the disadvantage in that the disc is destroyed each time the relief valve operates and must be replaced. In some cases the disc is even destroyed by a small amount of leakage in the valve. For these reasons this structure has been found unsatisfactory for commercial use.

A still further method of solving this problem has employed a loose fitting cap fitting over the outlet of the relief valve which is blown off when the relief valve operates. This method, though one of the better solutions to the problem, has certain disadvantages in that the cap is normally lost when blown off requiring the use of a new cap after each operation of the valve. It also has the disadvantage of requiring close inspection to determine if the valve has operated since the cap is difficult to distinguish from the valve body at a distance.

Since the relief valves of the type disclosed herein are often located on the tops of large tanks in relatively inaccessible positions it is desirable that the inspector be able to determine at a distance that the relief valve has operated.

It is an important object of this invention to provide a relief valve cap which protects the valve mechanism from exposure to the elements while not affecting the efficiency of the valve itself and which need not be replaced with a new cap after each operation of the relief valve.

Another object of this invention is to provide a relief valve cap attached to the relief valve outlet which is clearly visible even from a distance after the relief valve has operated.

It is a still further object of this invention to provide a relief valve cap which will not be displaced from position by a small amount of leakage.

The foregoing and other objects and advantages will become apparent in view of the following description taken in conjunction with the drawings, wherein:

Fig. 1 is a side elevation, partially in section, of the cap embodying this invention shown attached to a relief valve;

Fig. 2 is a plan view of one embodiment showing the wire which forms the hinge for the relief valve cap;

Fig. 3 is a perspective view of the form of the hinge wire wherein the wire is snapped into a groove formed in the outlet housing of the relief valve; and, Fig. 4 is a side elevation of the relief valve cap in the position it assumes after the relief valve has operated.

The relief valve illustrated in Fig. 1 incorporates many of the principles of construction of the relief described in the patent to Andrew G. Johnson, Patent No. 2,611,390 granted September 23, 1952.

The valve comprises a body 11 formed with a threaded portion 12 for mounting on a tank or other fitting, a hexagonal nut portion 13 and a circular portion 14 terminating in the outlet 15.

The structure described corresponds to that described in the above mentioned U. S. patent and reference to that patent will clearly describe various structural elements.

Under certain conditions, as the occurrence of a sleet or glaze storm, or an accumulating and congealing of snow in the valve, the movable valve members could be jammed by accumulations of ice. Although such failures may be rare, absolute reliability of a relief valve is of utmost importance and therefore it is highly desirable to eliminate any possibility of valve failure from such causes.

To achieve the above results and objects a cap 20 is provided to fit over the outlet 15 which is hinged to the exterior wall thereof. The cap 20 may, as shown, be formed with a flat circular central portion 21 and a depending flange 22.

It should be noted that the cap is formed so that it will slip easily into place with the flange 22 fitting loosely around the outlet 15. Thus slight leakages in the relief valve will not operate to remove the cover from its initial position. Securely fastened to the outer wall of the outlet 15 is a hinge wire 24 formed with a loop 25 which projects through an opening 26 in the flange 22 of the cap. The opening 26 is proportioned so that a loose fit is created around the loop 25 and effectively forms a hinge for the cap so that the cap may be rotated about the loop thereby opening the outlet 15 to full fluid flow as shown in Fig. 4. When the cap assumes this operated position after the operation of the relief valve, it is held by gravity in the open position thereby giving the inspector ample notice that the valve has operated. The attaching of the cap to the valve outlet also prevents the loss of the cap since the high pressures normally present when the valve opens would project the cap a substantial distance.

Since a relatively negligible amount of pressure is necessary to tip the cap out of the flow through the outlet 15 there is no sacrifice of the efficiency of the valve. The hinge wire 24 may be formed as a snap wire and positioned in a groove 27 formed in the circumference of the circular portion 14 as shown in Figs. 1, 3 and 4. Another form is shown in Fig. 2 wherein the hinge wire 24' is welded to the circumference of the circular portion 14.

It is apparent that the relief valve mechanism is protected against entry of water, ice or other foreign matter while not affecting the efficiency of the valve since the cap, when dislodged, presents absolutely no interference with the flow of gas from the outlet.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. In combination a relief valve having a vertically disposed cylindrical outlet body, the outer wall of said body having a groove formed therein adjacent the upper edge of the body, a wire surrounding the body disposed in said groove, a cover for the body having a horizontally disposed imperforate top and a depending circular flange, said flange having a hinge opening, said cover having an inside diameter exceeding the diameter of said wire around the body to provide an annular clearance space between the inside of the flange and the body, said wire having an outwardly extending integrally formed loop portion projecting through said opening in said flange whereby the cover may swing away from closed position over the opening.

2. A relief valve having a vertically disposed open topped cylindrical body, the outer wall of said body having a groove formed therein adjacent the top edge of the body, a wire surrounding the body in said groove, a cover for the body having a flat horizontally disposed disk overhanging the upper edge of the body and a depending circular flange extending downwardly from the disk below the wire surrounding the body, said flange having an opening therein in the horizontal plane of said wire, said cover flange having an inside diameter exceeding the diameter of the wire around the body to provide an annular space between the inside of the flange and the body, said wire having an outwardly extending curved loop portion projecting through the opening in said flange whereby the cover may swing from closed position over the body to an open position away from the body to signal operation of the relief valve.

References Cited in the file of this patent

UNITED STATES PATENTS

| | | |
|---|---|---|
| 204,463 | Voege | June 4, 1878 |
| 385,011 | Rodiger | June 26, 1888 |
| 1,406,683 | Regan | Feb. 14, 1922 |
| 1,686,969 | Hebden | Oct. 9, 1928 |
| 2,506,737 | Paquin | May 9, 1950 |
| 2,611,390 | Johnson | Sept. 23, 1952 |
| 2,647,534 | Freeman | Aug. 4, 1953 |

FOREIGN PATENTS

| | | |
|---|---|---|
| 101,611 | Great Britain | Oct. 5, 1916 |